United States Patent [19]
Flanagan, Jr.

[11] 3,724,117
[45] Apr. 3, 1973

[54] FISHING JIG HAVING A FLEXIBLE BODY

[76] Inventor: Lindley E. Flanagan, Jr., 5700 Rockville Road, Fort Worth, Tex. 76112

[22] Filed: Sept. 3, 1971

[21] Appl. No.: 185,122

[52] U.S. Cl. .............43/42.24, 43/42.32, 43/42.37, 43/42.39
[51] Int. Cl. ..............................................A01k 85/00
[58] Field of Search...........................43/42.24, 42.37

[56] References Cited

UNITED STATES PATENTS

| | | | |
|---|---|---|---|
| 3,122,853 | 3/1964 | Koonz et al. .........................43/42.24 |
| 3,611,614 | 10/1971 | Ward....................................43/42.37 |

*Primary Examiner*—Hugh R. Chamblee
*Assistant Examiner*—Daniel J. Leach
*Attorney*—James M. Cate

[57] ABSTRACT

A fishing jig having a hook, weight means for causing the lure to sink within the water, means for maintaining the lure in a substantially upright position within the water, and an elongated body of flexible, resilient, sheet material. The body extends from the weight means alongside the hook shank and is free to flex in a direction away from the hook shank but is prevented by the shank from flexing substantially in the opposite direction. The jig achieves a generally horizontal motion through the water when alternately raised and lowered within the water and combines desirable characteristics of conventional jigs and conventional lures of the type which are trolled or retrieved horizontally through the water. In a preferred embodiment, the body is canted in a manner which causes the jig to move about a circular path beneath the tip of the fisherman's rod.

8 Claims, 9 Drawing Figures

PATENTED APR 3 1973 3,724,117
SHEET 1 OF 2
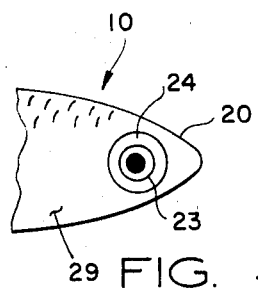
FIG. 4
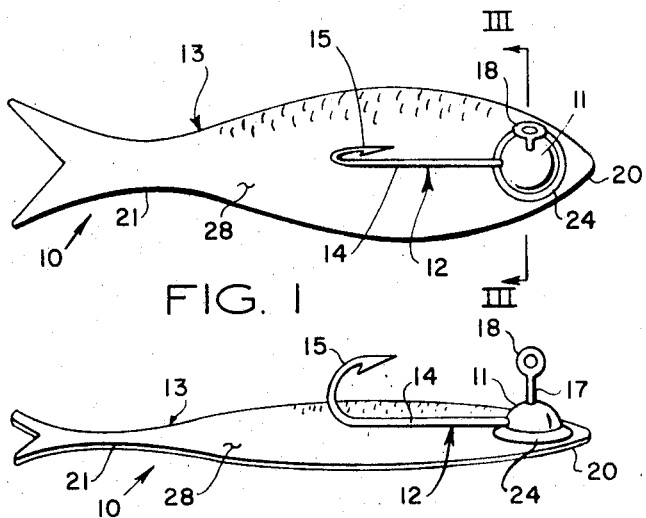
FIG. 1
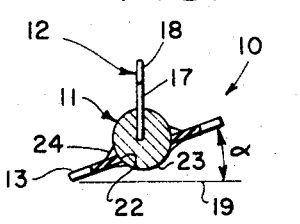
FIG. 3
FIG. 2
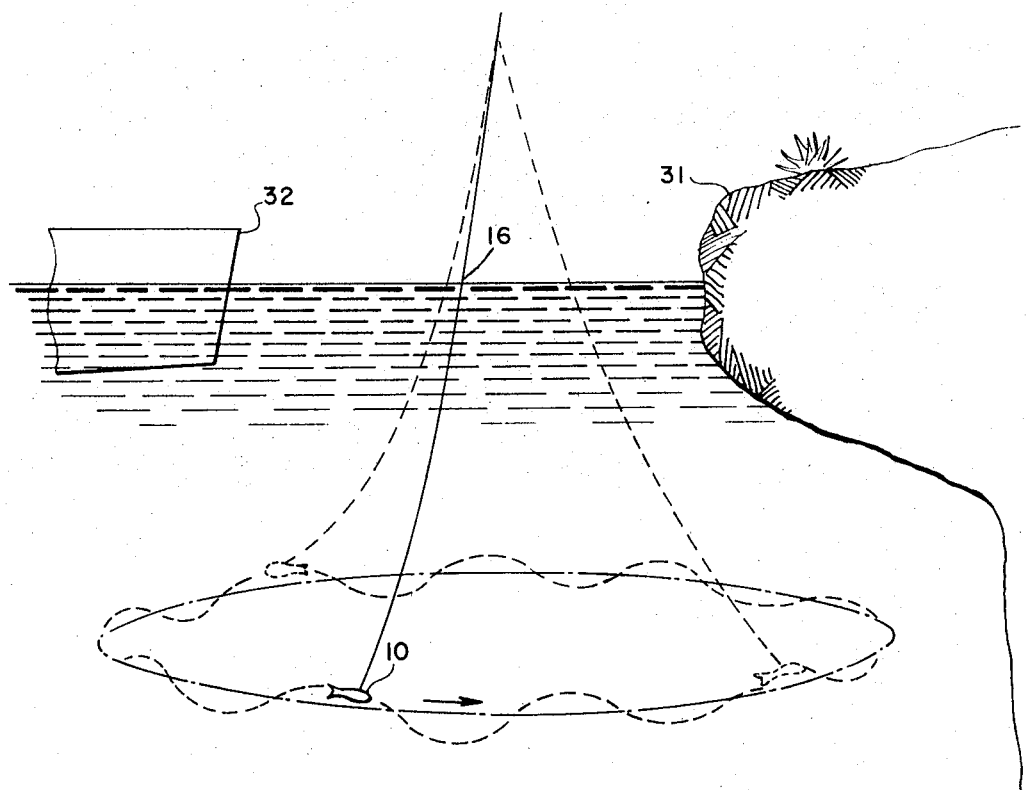
FIG. 5

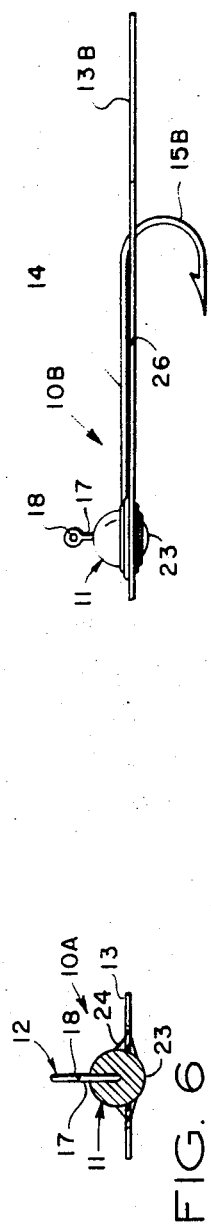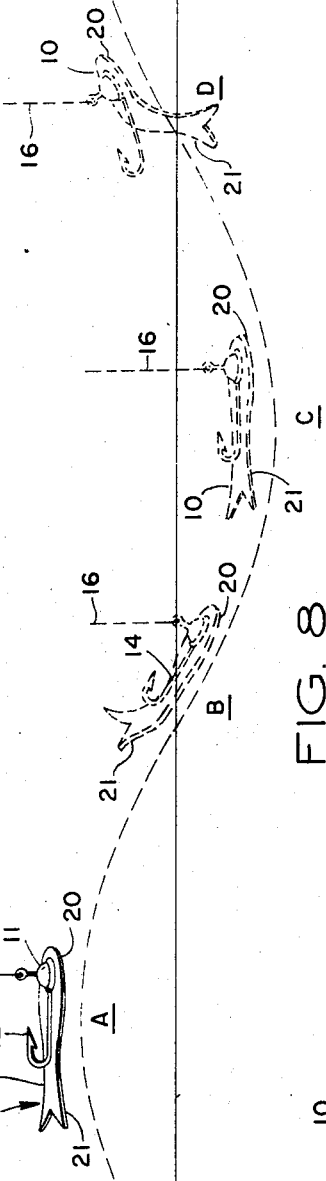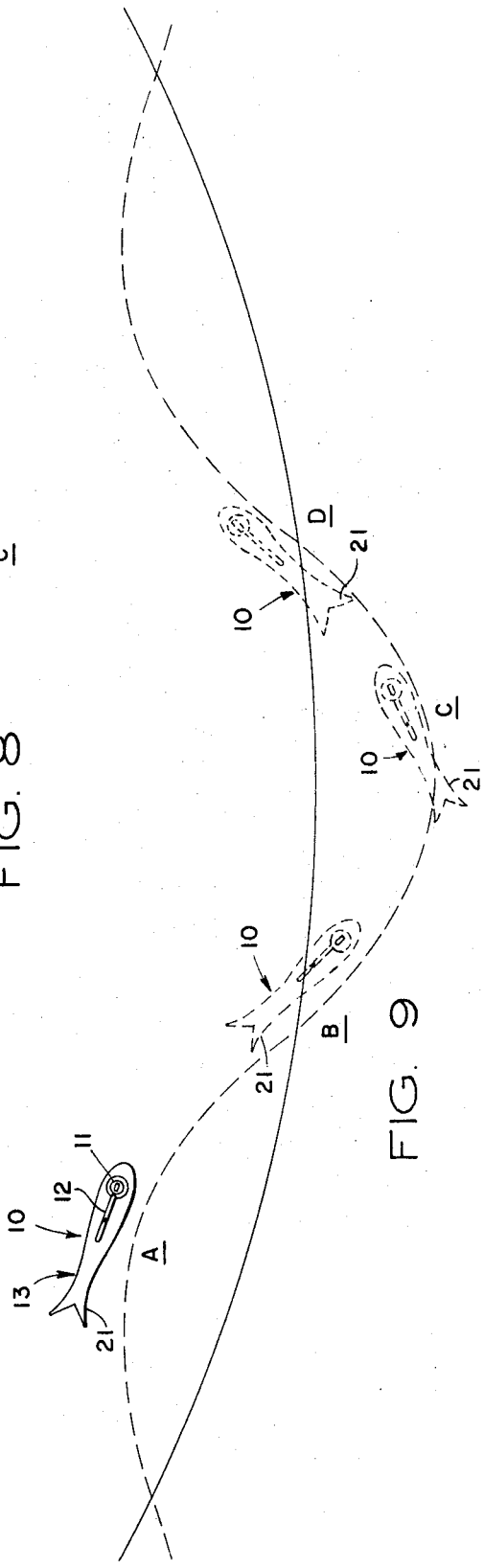
FIG. 6
FIG. 7
FIG. 8
FIG. 9

FISHING JIG HAVING A FLEXIBLE BODY

This invention relates to fishing lures and, more particularly, to a fishing lure of the jig type which, in use, is alternately raised and lowered within the water.

Artificial fishing lures employed below the water surface are principally of two broad categories. The first includes plugs, spoons, spinners, etc., which are either trolled behind a moving boat or cast over the water and retrieved beneath the water surface. In either case, the path of the lure is generally a straight, approximately horizontal line through the water, the motion being modified only to the extent that the lure may vibrate or dart from side to side from its general path. The second category is the jig, which is suspended within the water below the tip of the fisherman's rod and alternately raised and lowered short distances within the water by upward and downward movement of the rod tip. Lures of the type which are trolled or cast during use afford the advantage of traversing a relatively long distance through the water as they are retrieved or trolled, but they have the disadvantage of passing relatively quickly through an area where a concentration of fish may be located. The jig, on the other hand, may be employed in a particular location for as long as the fisherman desires, since he need only position his rod tip over the area he wishes to fish and jig the lure. This allows a fish time to observe the lure, overcome its natural caution, and strike the lure when it believes the lure to be a natural object. Another advantage of the jig is that it is not as likely to become entangled with underwater obstructions such as sunken brush and under-water aquatic plants, because it is not dragged horizontally into such obstacles. Still another advantage of the jig is that it is more easily fished from crowded piers, jetties, and party boats, because it is not necessary to cast the jig out, an action that requires the area immediately behind the fisherman to be clear so that he can make his back cast prior to his forward cast. Furthermore, the jig is not so apt to become entangled in the fishing lines of other fishermen because it is not cast out, and possibly across such lines.

The conventional jig has an important disadvantage, however, in that its path through the water is substantially vertical. As is generally known, small fish and insects that the jig may simulate do not swim upwardly and downwardly in a truly vertical path, even when injured. Conventional jig lures thus do not simulate the swimming motion of small fish and minnows, which are a major natural food source of many desirable game fish. It is considered that a lure which has a motion similar to an injured minnow or small fish and has the general appearance of a minnow or small fish is most effective in enticing larger fish to strike.

An objection to many artificial lures used in casting, trolling, and also jigging is that because of their construction of hard, rigid materials, such as metal, wood, or hard plastic, a fish that strikes the lure senses immediately that the object is not a form of natural food, and instantly rejects the lure before the fisherman can set the hook.

It is, accordingly, a major object of the present invention to provide a new and improved fishing lure.

Another object is to provide a jig-type lure, which, upon being alternately raised and lowered within the water, achieves a generally horizontal swimming motion through the water simulating the movement of a small fish.

Yet another object is to provide such a lure which in use achieves a generally horizontal swimming motion about a generally circular path.

A still further object is to provide such a lure which, while translating in a generally circular path, also moves alternately in upward and downward directions and in alternately leftward and rightward directions, simulating the motion of a wounded minnow or small fish swimming on its side.

An additional object is to provide a lure achieving such an action which includes a body portion which undulates back and forth during use to simulate the motion of the body and tail of a small fish for further attracting the fish, the body having a reflective surface for reflecting rays of light in various directions through the water to attract the fish.

Yet another object is to provide such a lure which is of practicable and inexpensive construction.

Other objects and advantages will be apparent from the specification and the accompanying drawing illustrative of the invention.

In the drawing:

FIG. 1 is a longitudinal view of a lure constructed according to a preferred embodiment of the present invention and showing the upper side of the flexible body in plan;

FIG. 2 is a side view of the lure of FIG. 1;

FIG. 3 is a cross-sectional view of the lure of FIGS. 1 and 2 taken as on line III — III of FIG. 1;

FIG. 4 is a fragmentary, plan view of a portion of the lower side of the flexible body of the lure of FIGS. 1-3;

FIG. 5 is a diagrammatic, perspective view illustrating the approximate path of the lure of FIGS. 1-4 as it moves through the water;

FIG. 6 is a cross-sectional view, similar to FIG. 3, of a second embodiment of the lure;

FIG. 7 is a longitudinal, side view of a further modification of the lure;

FIG. 8 is a diagrammatic view illustrating a portion of the path of the preferred embodiment of the lure as viewed from the side and in an enlarged scale relative to that of FIG. 5; and FIG. 9 is a view similar to FIG. 8 showing the path of the preferred embodiment as viewed from above.

With initial reference to FIG. 1, a preferred embodiment of the lure 10 includes a weight 11, a hook 12, and a normally flat, elongated body 13 affixed to the weight. The hook 12 includes an elongated shank 14 which, upon the lure 10 being in an upright position, extends rearwardly from the weight 11 in an approximately horizontal direction. The shank 14 extends to, and is continuous with, an arcuate hook portion 15 which projects away from the body 13, or upwardly in the present, illustrative embodiment. Connecting means is provided for receiving a fishing line 16 (FIG. 5) the connecting means preferably comprising an integral, upwardly extending or vertical portion 17 of the hook 12 having an upper, distal end having an eye 18 formed therein for receiving the line. The vertical hook portion 17 projects perpendicularly from the shank 14 in a plane contiguous with the arcuate hook portion 15, and in a vertical plane upon the lure 10 being in an upright position. The juncture of the vertical hook portion 17 and the shank 14 is embedded within the weight 11 to rigidly seat the hook 12 within the weight and thus prevent either axial or rotational movement of the hook 12 relative to the weight. The weight 11 is suitably of lead and of substantially spherical shape and is necessarily of sufficient weight to sink the lure 10 within the water. Upon the lure 10 being suspended by a line 16 (FIG. 5) connected through the eye 18, the vertical hook portion 17 serves to maintain the lure in an upright position within the water because the weight 11 exerts a continuous, downward force on the lower end of the vertical portion. That is, the weight 11 comprises a major portion of the total mass of the lure 10, and the center of gravity falls within the weight 11. The lure 10 thus remains in a substantially upright position within the water because the center of gravity of the lure is located within the weight 11 and is thus substantially directly below the eye 18.

The body 13, in plan, is preferably configured in the shape of a small fish and has a front portion 20 to which the weight 11 is affixed and a rear portion 21 extending rearwardly from the weight 11 for a distance, for example, of approximately twice the length of the hook 12. The body 13 has an upper surface 28 confronting the hook 12 and a lower surface 29 (FIG. 4). The weight 11 is rigidly affixed to the front body portion 20 on a central longitudinal axis of the body 13 by a suitable adhesive, such as RTV adhesive/sealant silicone rubber, manufactured by Dow Corning Corporation. Preferably, the body 13 has an opening 22 (FIG. 3) formed through the front portion 20 of the body for receiving the weight 11 and permitting a portion 23 of the weight to project downwardly through the opening. For the weight 11 of spherical configuration, the opening 22 is thus of circular shape and of somewhat smaller diameter than the weight. This construction permits the application of continuous fillets 24 of adhesive around the weight 11 and over appropriate areas of both sides 28 and 29 of the body 13 for improving the bond between the body 13 and the weight 11. The downwardly projecting portion 23 is thus of semi-spherical form resembling the shape of an eye, and it is preferably provided additionally with markings which simulate the eye of a fish, as illustrated in FIG. 4.

The body 13 is an important factor in achieving the unique action of the lure, which action will be described in detail hereinbelow. As has been partially suggested, the body 13 is formed of an elongated strip of flexible, resilient sheet material. In the preferred embodiment of FIGS. 1–5, and upon the lure 10 being in its upright position in which the upright hook portion 17 is vertically disposed, the body 13, in cross-section, is canted from a horizontal plane intersecting the lure 10 and parallel to the line 19 of FIG. 3. As viewed from the front, the body 13 is canted about its central, longitudinal axis by an angle of approximately 15°–35°, and suitably in a counterclockwise direction as shown. The effect of this canted configuration will become apparent from the discussion to follow. In a modified, second embodiment 10A (FIG. 6), the body 13, weight 11, and hook 12 are similarly constructed, but the body 13 is not canted from the perpendicular but, instead, is normal to the vertical hook portion 17A.

With reference again to FIGS. 1–3, the body 13 has sufficient rigidity to maintain an approximately flat configuration when the lure 10 is suspended at rest within the water and sufficient flexibility to permit the rear body portion 21 to flex upwardly and downwardly freely as the lure 10 is maneuvered within the water. The body 13 is adjacent the hook shank 14 and is thus prevented by contact with the shank from substantial flexure in a direction toward the shank but is free from contact with the hook 12 upon flexing in a direction away from the shank, thus permitting substantial flexure of the body in the direction away from the shank. A preferred material for the body 13 is polyethylene terephthalate in sheet form, of a thickness of about 0.001–0.003 inch for lures of approximately two to four inches in length. This thickness has been greatly exaggerated in the drawings for clarity. Other suitable materials include vinylidene chloride-vinyl chloride copolymers and other plastics, natural and artificial rubbers, and metals such as aluminum and stainless steel, in thin sheet or foil form. The resilient body 13 provides the advantage over lures of rigid wood or metal of more closely simulating the movement and texture of natural food sources of the fish. A fish which strikes or brushes against the lure 10 may not readily detect that the resilient body 13 is artificial and may strike again, whereas a lure of the type employing a body of rigid construction may frighten the fish on contact. It is also desirable that the body 13 have a mirrored finish, represented by surfaces 28 and 29, for further attracting game fish, such a finish preferably being applied in the case of the plastic body materials by vacuum deposition of aluminum on the plastic.

With respect now to the operation of the lure, the action of the second embodiment of FIG. 6 is simpler than that of the preferred embodiment of FIGS. 1–4 and is therefore described first. In use, the lure 10A is suspended by a line which is suitably connected to the eye 18 through a swivel connector of conventional manufacture (not shown) or tied directly to the eye 18. The lure 10A is initially suspended directly beneath the tip of the fisherman's rod at a desired depth and is actuated in essentially the same manner as other lures of the jig type; that is, the lure is alternately raised and lowered within the water by appropriate up and down movements of the tip of the fishing rod. As the line is lowered to permit the lure 10A to sink within the water, the weight 11 still exerts a downward force, putting tension on the line and on the vertical hook portion 17. This force maintains the vertical hook portion in an approximately vertical orientation, and the vertical hook portion thus serves to keep the lure 10A in an upright position, with the body 13 in an approximately horizontal orientation, but with some degree of upward or downward pitch as the lure 10A is jigged up and down. As the lure 10A is permitted to descend within the water, the body 13 is flexed upwardly against the hook shank 14 by the water pressure against the lower body surface 29, and this flexing, combined with a slight forward and downward slope of the lure 10A, imparts a generally forward, gliding motion to the lure. When the fishing rod tip and the line are then raised, the forward end of the lure 10A is pulled upwardly, and the lure 10A is given an upward pitch and urged in a forward direction by water pressure on the upper body surface 28, now inclined downwardly to the rear. The vertical hook portion 17 again tends to maintain the lure 10A in an approximately horizontal orientation. The relatively downward pressure of the water against the upper surface 28 of the body 13 during upward movement of the lure 10A causes the body 13 to flex downwardly to a substantial degree, the body 13 being free of contact with the hook 12 and thus not supported by the hook as in the downward movement of the lure. Because of this greater degree of flexing, the body 13 does not react with the water as strongly as it does during the downward motion of the lure 10A, and the lure 10A thus travels forwardly somewhat less than it does during the downward motion. (This difference in response of the body has important significance in the operation of the preferred embodiment of the lure 10 of FIGS. 1–4, as will become apparent.)

As the second embodiment of the lure 10A is continuously worked by sharp upward and downward movements of the rod tip, the lure 10A moves in a generally forward direction, away from the tip of the rod, until it begins to climb upwardly in an arc about the rod tip until its weight prevents further progress, at which time the lure may swing off randomly to the left or right. This second embodiment 10A is thus useful when the fisherman desires to maneuver the lure 10A forward in a generally straight path. For example, the lure 10A may be maneuvered conveniently toward and under an object in the water such as an overhanging rock or a pier.

With respect now to the operation of the preferred embodiment of the lure 10 (FIGS. 1–4) wherein the body 13 is canted, it will be apparent from the description to follow that the canted body 13 serves to impart a generally circular motion to the lure, as illustrated in FIG. 5. The action of the lure 10 will be described in detail with reference to its motion through a segment of its path including positions A, B, C, and D, as seen most clearly in FIGS. 8 and 9. By way of initial summary, however, the particular configuration of the lure 10 chosen for illustration, wherein the body 13 is canted in a counterclockwise direction when viewed from the front (FIG. 3), tends to move through the water from an initial position directly beneath the tip of the rod in a generally forward direction as it is jigged up and down, just as the above-described embodiment of FIG. 6. In addition, forces generated by its upward and downward movement within the water urge the lure 10 somewhat to the right and also tend to rotate it in a counterclockwise direction such that it moves forwardly and outwardly from the rod tip but also continues to turn to the left. As the lure 10 thus moves a distance from beneath the rod tip, it is restrained by the line 16 from further movement to the right, and the lure begins to move about a circular path in a counterclockwise direction, as viewed from above. It should be noted that if the body 13 is instead canted in a clockwise direction as viewed from the front, the lure 10 will move in a clockwise direction instead of in a counterclockwise direction as previously described.

With added reference to FIGS. 8 and 9, the action of the preferred embodiment of the lure 10 will now be described in detail. Position A represents the location of the lure 10 when the rod tip is raised to its uppermost vertical position. Described below is the motion of the lure 10 through one cycle of the jigging action by the fisherman, i.e., from the highest to the lowest and back to the highest position of the rod tip, it being noted that this vertical travel of the rod tip is normally no more than a few inches at most.

As the rod tip is lowered from its highest point, the tension on the line 16 is relaxed and the weight of the lure 10 causes the lure to move downwardly through the water. The vertical hook portion 17, kept in an upright position by the line 16, again acts to maintain the lure 10 in a substantially upright position. Since the lure body 13 initially presents an essentially flat surface to the water as the lure descends, the pressure of the water causes the body 13 to deflect upwardly so that the rear or tail portion 21 of the body 13 is above the body front portion 20. The water pressure exerts a continuing force on the canted and deflected body 13 as the lure 10 continues its downward motion. Under the influence of that force the lure 10 moves in a forward direction and also moves outwardly from the center of the circle. Additionally, the canted tail 21 of the body 13 is urged outwardly, causing the lure to rotate in a counterclockwise direction, when viewed from above, about an axis coincident with the line 16 at the point at which the line is attached to the lure 10.

Position B is the mid-point of both the outward and the downward displacements of the lure 10. At this point the tail portion 21 of the body 13 is deflected upwardly, the lure 10 is moving forwardly, downwardly, and outwardly, and the lure 10 is rotating about an axis coincident with the line 16 at the point at which the line 16 is attached to the lure, the tail 21 swinging outwardly from the center of the circular path.

Position C is the lowest point in the path of the lure 10 and is reached when the tip of the fisherman's rod is lowest. Position C is also the point at which the lure 10 is most distant from the center of its circular path. Since at this point the fisherman is no longer allowing the lure 10 to descend, the direction of travel of the lure 10 is horizontally forward, that motion being caused by its forward momentum after having been accelerated forwardly and downwardly from positions A and B. The tail 21 is no longer subjected to the water pressure that caused it to deflect and has therefore returned to its normal position essentially parallel to the shank 14 of the hook 12. However, the lure 10 and the tail 21 are still oriented with the tail in its outwardly rotated or extreme counterclockwise orientation.

As the fisherman then raises the rod tip, the lure 10 moves toward position D, its motion now being opposite its motion during movement from position A to position C; thus the lure 10 now moves forwardly, upwardly and inwardly with respect to its overall circular path, with the tail 21 deflected downwardly. The water pressure against the tail 21 now causes the lure 10 to rotate in a clockwise direction, the tail 21 moving inwardly. In addition, the water pressure creates a force that urges the lure 10 in a forward direction impelling the lure 10 forwardly along its generally circular path.

Position D is the mid-point of the inward and upward displacement of the lure 10. Here the tail 21 of the lure 10 is deflected downwardly, the lure is moving forwardly, upwardly, and inwardly, and the lure 10 is rotating in a clockwise direction.

The lure 10 then progresses upwardly until it reaches the uppermost position of its travel, this position corresponding to position A as previously described.

An important factor relative to the generally circular motion of the lure 10 is that there is a significant difference in the amount of deflection of the tail 21 during the downward and the upward movement of the lure 10. In the downward movement, i.e., from position A to position C, the tail 21 deflects upwardly until it bears on the shank 14 of the hook 12, at which point it is restrained. Since the body 13 is positioned immediately adjacent the hook shank 14, contact with the shank 14 prevents any substantial flexure of the tail 21 upwardly or toward the hook shank 14. In the upward movement from position C through position D, the tail 21 is deflected substantially downwardly, since the tail 21 is unrestrained by the hook 12. As a consequence, the pressure of the water on the canted, deflected body 13 is greater during the downward motion, causing the lure 10 to move outwardly in its circular path and the tail 21 to rotate outwardly. During the upward motion of the lure 10, the effect of the water pressure on the more greatly deflected lure body 13 is to cause the lure to move inwardly and to rotate in a clockwise direction, but the amount of rotation is less than occurs during downward movement because the body rear portion 21 does not strongly resist the relatively downward force of the water. The effect of this difference is to cause the lure 10 to have a net counterclockwise rotation about the axis of the line 16, so that as the lure 10 progresses forwardly, its forward end continually turns to the left and generally points in the direction of travel. This is an essential factor in producing the circular motion of the lure 10.

In summary, then, it is seen that the preferred embodiment of the lure 10 follows an essentially circular, horizontal path, having small deviations from the circular path consisting of downward, outward displacements followed by upward, inward displacements, and that the tail 21 deflects upwardly and is moved outwardly as the lure 10 moves downwardly and outwardly. Then, the tail 21 deflects downwardly and is moved inwardly of the circular path as the lure 10 moves upwardly and inwardly and is rotated in a clockwise direction. The combined movement is similar to that of an injured minnow struggling to swim on its side, unable to right itself, and unable to maintain a straight path through the water.

Referring particularly to FIG. 5, by letting out more line 16, the fisherman may give the lure 10 more leeway and permit the lure to travel in a circular path of greater diameter when desired; or, the lure 10 can be restricted to a narrower path by shortening the line 16. In the drawing, the path of the lure 10 is somewhat exaggerated with respect to the length of the line 16 for clarity. The size of the circular path may also be varied while the length of the line 16 is held constant by varying the intensity of the jigging action imparted by the fisherman. Vigorous upward and downward motion of the rod tip through several inches of vertical distance produces a circular path of relatively large diameter, while a more moderate motion of the rod tip causes the lure to travel in a smaller circular path. Thus, the fisherman has a choice of working his lure through a large area of water or a smaller area, at the same depth, simply by changing the action of his rod. It can thus be seen that the circular action is advantageous when it is desired to work the lure 10 under overhanging rocks 31 or other obstructions such as a boat 32 or a pier (not shown).

While the last-described embodiment is preferred, various other modifications are also possible. For example, it may be desired to position the hook beneath the body with the arcuate hook portion projecting downwardly, away from the body lower surface. In this case, assuming the body is canted in the same direction as that shown for the preferred embodiment, the lure achieves a generally clockwise circular path, because the body is supported by the hook shank by contact therewith, during upward rather than downward movement of the body, and the body rear portion 21 is urged predominantly to the left, thus turning the front end of the lure to the right and into a generally clockwise circular path. Again, an important factor is the positioning of the body adjacent the hook shank such that the body is prevented, by contact with the shank, from substantial flexure in a direction toward the shank but is free of contact with the hook upon flexing in a direction away from the shank, thus permitting substantial flexure of the body only in a direction away from the shank. In a further modification, shown in FIG. 7, the hook shank 14 extends over the body as in the preferred embodiment, but the arcuate hook portion 15B projects downwardly through an additional hole 26 formed through the rear portion of the body 13B, the additional hole being large enough to permit substantial flexure of the body in a direction away from the hook shank. This modification has the effect of making the lure less apt to become snagged with underwater brush or the like, and it may also be used with the body 13B canted as in the preferred embodiment.

It can be appreciated that the life-like swimming motion of the lure is quite effective in attracting various game fish and enticing them to strike. Because of the alternating, up and down motion of the lure in conjunction, in the preferred embodiment, with its generally horizontal, circular swimming motion, the lure simulates the movement of a wounded minnow or small fish swimming on its side and struggling to right itself. Additionally, the natural undulation and flexing of the resilient, flexible, rear body portion is effective in simulating the back and forth movement of the tail of a small fish during swimming. The mirrored finish of the body enhances the visual impression caused by the flexing and undulation of the body in the water and attracts game fish in the manner of lures of the spoon type.

The preferred embodiment of the lure, in which the body is canted, therefore combines several advantageous characteristics of the two general classes of underwater lures cited above in the discussion of related prior art, i.e., the plug and jig types. The lure achieves a generally horizontal swimming motion which simulates the swimming motion of a live fish, yet does not require the fisherman to impart any action other than a simple, vertical jigging motion of the tip of his rod. Because of its generally circular path, the preferred embodiment of the lure stays in a relatively small area, thereby giving wary fish a continuous opportunity to observe its action, overcome natural caution, and strike. The lure is thus useful when a fisherman knows or believes the fish to be located in a specific location and wishes to concentrate his efforts in that area. At the same time, the horizontal swimming motion permits the lure to travel through a larger area than conventional jigs and to do so in a more natural, realistic fashion. The localization of the path of the lure, as compared with conventional plugs which travel continuously in a straight, single direction, is also of great benefit when the fisherman must fish from a crowded pier or boat or when it is desired to work the lure beneath underwater obstructions, overhanging banks, or in deep holes which cannot be reached by conventional, plug lures.

As has been suggested, because of its flexible body, the lure is not easily distinguished by the fish from natural food sources should the fish brush against the lure or strike without being hooked. The lure is largely of resilient material more closely approximating the resilient body of a small fish, in contrast to conventional lures of the type having rigid plastic, wooden, or metallic body structures.

Finally, it should be noted that while providing the numerous advantages described herein, the lure is not of increased complexity nor of more difficult manufacture than analogous prior-art devices. Rather, it is of relatively simple and inexpensive construction, requiring only a few, easily formed parts.

While only two embodiments of the invention, together with modifications thereof, have been described in detail herein and shown in the accompanying drawing, it will be evident that various further modifications are possible in the arrangement and construction of its components without departing from the scope of the invention.

What is claimed is:

1. A fishing lure of the jig type which, in use, is suspended by a line within a body of water and alternately raised and lowered within the water for attracting fish, the lure comprising:

weight means for causing the lure to sink within the water;

a body of an elongated sheet of flexible, resilient material, the body having upper and lower major surfaces and having a forward portion affixed to the weight means, and a rearward portion, the body, upon the lure being positioned in an upright position, extending rearwardly from the weight means in a substantially horizontal direction;

a hook immoveably positioned with respect to the weight means and having an elongated shank and an arcuate portion, the shank extending rearwardly, alongside one of the body major surfaces, to the arcuate hook portion, the hook shank being positioned adjacent the body for preventing substantial flexure of the body in a direction toward the hook shank, the body being free of contact with the hook upon flexing in a direction away from the hook shank for permitting substantial flexure of the body away from the hook shank;

connecting means for receiving the line and, upon the lure being supported by the line within a body of water, for maintaining the lure in a substantially upright position.

2. The apparatus of claim 1, wherein, upon the lure being positioned in an upright position, the body is canted in cross-section from a horizontal plane intersecting the lure.

3. The apparatus of claim 2, wherein the body is canted from a horizontal plane intersecting the lure by approximately 15° to 35°.

4. The apparatus of claim 1, wherein the connecting means comprises an elongated member fixedly associated with the weight means and projecting substantially upwardly from the weight means upon the lure being in an upright position, the elongated member having an upper, distal, end portion having an eye for receiving the line.

5. The apparatus of claim 4, wherein the elongated member constitutes an extension of the hook shank.

6. The apparatus of claim 1, wherein the body is of a sheet of plastic material having a metallic finish for attracting fish.

7. The apparatus of claim 1, wherein the body, in plan, is in the shape of a small fish.

8. A fishing lure of the jig type which, in use, is suspended by a line within a body of water and alternately raised and lowered within the water for attracting fish, the lure comprising:

weight means for causing the lure to sink within the water;

a body of an elongated sheet of resilient material, having first and second, opposite, major surfaces, the body having a forward portion affixed to the weight means, and a rearward portion;

a hook rigidly connected to the weight means and having a shank portion extending rearwardly from the weight means and a line receiving portion extending perpendicularly from the shank in a normally upward direction, the line receiving portion having an upper, distal end portion having an eye for receiving the line, the lure, upon being suspended by a line connected through the eye, having a center of gravity substantially directly below the eye whereby the lure is normally maintained in an upright position, the body extending rearwardly from the weight means in a horizontal direction, upon the lure being in an upright position, but being canted in cross-section from a horizontal plane intersecting the lure.

* * * * *